US008389643B2

(12) United States Patent
Couvreur et al.

(10) Patent No.: US 8,389,643 B2
(45) Date of Patent: Mar. 5, 2013

(54) COPOLYMERS BASED ON METHACRYLATE UNITS, PREPARATION METHOD THEREOF AND USE OF SAME

(75) Inventors: Laurence Couvreur, Paris (FR); Stephanie Magnet, Morlanne (FR)

(73) Assignee: Arkema France, Colombes (FR)

( * ) Notice: Subject to any disclaimer, the term of this patent is extended or adjusted under 35 U.S.C. 154(b) by 299 days.

(21) Appl. No.: 12/520,672

(22) PCT Filed: Dec. 20, 2007

(86) PCT No.: PCT/FR2007/052589
§ 371 (c)(1),
(2), (4) Date: Nov. 25, 2009

(87) PCT Pub. No.: WO2008/078055
PCT Pub. Date: Jul. 3, 2008

(65) Prior Publication Data
US 2010/0069577 A1    Mar. 18, 2010

Related U.S. Application Data

(60) Provisional application No. 60/939,141, filed on May 21, 2007.

(30) Foreign Application Priority Data

Dec. 22, 2006 (FR) ...................................... 06 55926

(51) Int. Cl.
*C08F 20/10* (2006.01)
*C08F 2/38* (2006.01)
(52) U.S. Cl. ..................................... 525/345; 526/219.3
(58) Field of Classification Search .................. 525/345; 526/219.3
See application file for complete search history.

(56) References Cited

U.S. PATENT DOCUMENTS 6,512,081 B1    1/2003   Rizzardo et al.
2003/0060577 A1  3/2003   Benicewicz et al.
2004/0106732 A1* 6/2004  Tsuji et al. ..................... 525/94

* cited by examiner

*Primary Examiner* — Robert D. Harlan
(74) *Attorney, Agent, or Firm* — RatnerPrestia

(57) ABSTRACT

The invention relates to a method for preparing a copolymer having a backbone based on methacrylate units, comprising a step involving the polymerization of one or more precursor methacrylate monomers of said units in the presence of: a polymerization initiator; at least RAFT-type transfer agent which can generate a primary radical; and at least one comonomer selected from among styrene monomers and acrylate monomers. The invention also relates to the resulting copolymers capable of being obtained according to this process, in particular block copolymers, in particular block copolymers, and to the use thereof as additives for plastic materials.

14 Claims, 1 Drawing Sheet

COPOLYMERS BASED ON METHACRYLATE UNITS, PREPARATION METHOD THEREOF AND USE OF SAME

This application claims benefit, under U.S.C. §119 or §365 of FR 0655926 filed Dec. 22, 2006; U.S. 60/939,141 filed May 21, 2007; and PCT application PCT/FR2007/052589 filed Dec. 20, 2007.

TECHNICAL FIELD

The present invention relates to a process for the controlled radical polymerization of one or more methacrylate monomers in the presence of at least one specific comonomer and at least one specific transfer agent.

The general field of the invention is thus that of controlled radical polymerization.

Radical polymerization controlled by virtue of the use of transfer agents makes it possible to reduce the reactions whereby the growing radical entity is deactivated, in particular the termination stage, which reactions, in conventional radical polymerization, interrupt the growth of the polymer chain in an irreversible and uncontrollable fashion.

In order to reduce the probability of the termination reactions, the proposal has been made to temporarily and reversibly block the growing radical entity with a formation of stable "intermediate radical" entities. This thus makes it possible to restart the polymerization and to obtain an alternation between periods of growth of the active radical entities and periods of halting of growth during which these radical entities are dormant. This alternation results in a gradual increase in the average molecular weight as a function of the progression of the polymerization reaction, which for this reason takes place in a controlled fashion. This control is often reflected by a narrower distribution in the molecular weights of the polymer (and thus a lower polydispersity index) than in conventional radical polymerization. This also makes it possible to synthesize block copolymers by reactivating the polymerization with a new monomer starting from a dormant polymer entity.

A particular type of controlled radical polymerization is "RAFT" (Reversible Addition Fragmentation Transfer) polymerization which makes use in particular of sulphur compounds as transfer agents to give polymers exhibiting a controlled architecture, in particular with regard to the polydispersity index.

Such transfer agents are described, for example, in U.S. Pat. No. 6,512,081, WO 98/01478, WO 99/31144, EP 825 247.

"RAFT" polymerization makes it possible to obtain polymers with a polydispersity index which is significantly lower than that obtained for polymers obtained by a conventional radical polymerization process (without "RAFT" chain transfer agent).

This type of polymerization has in particular already been employed to prepare homopolymers comprising methacrylate units, such as polymethyl methacrylate (PMMA), with a transfer agent of dithiobenzoate type which generates a secondary or tertiary radical, the agents which generate tertiary radicals being preferred (cf. Macromolecules, 2005, 38, 3129-3140; Macromolecules, 2003, 36, 2256-2272; or Examples 19 and 20 of WO 98/01478), styrene polymers, such as PS, prepared in the presence of a primary transfer agent, dibenzyl trithiocarbonate (DBTTC) in Example 23 of WO 98/01478; or in the presence of a secondary RAFT agent, 1-phenylethyl phenyldithioacetate (cf. Journal of Polymer Science, Part A, Vol. 42, 6248-6258 (2004), which also describes the synthesis of PMMA and of styrene-MMA random copolymers; the polydispersity index of the PS is low but that of the PMMA is very high and it increases for the copolymer with the level of MMA present in the copolymer), and also styrene-MMA block copolymers described, for example, in Polymer, 46 (2005), 9762-9768, whether synthesized in the presence of a secondary RAFT transfer agent (1-phenylethyl phenyldithioacetate) or tertiary RAFT transfer agent (cumyl dithioacetate), MMA-styrene and MMA-butylacrylate random copolymers in the presence of a tertiary RAFT transfer agent (cumyl dithioacetate).

However, to date, the methacrylate polymers obtained from this type of transfer agent exhibit a low polydispersity index but, in order to obtain an acceptable degree of conversion of the polymerization reaction, typically of greater than or equal to 50% and preferably of greater than 60%, it is then necessary to prolong the duration of the polymerization up to several tens of hours.

Thus, the Inventors set themselves the target of developing a process for the preparation of a copolymer based on methacrylate units which makes it possible to obtain a copolymer generally exhibiting a polydispersity index of less than or equal to 2 or at the very least less than that obtained with the radical polymerization processes of the prior art.

They have thus discovered, surprisingly, that, by polymerizing the methacrylate monomer or monomers in the presence of at least one specific transfer agent and of at least one specific comonomer, it is possible to reduce the polydispersity index of the copolymers obtained, in comparison with the polydispersity index of the polymers obtained without the presence of the said comonomer, with a degree of conversion of the polymerization reaction of more than 50% generally obtained after less than 10 hours.

ACCOUNT OF THE INVENTION

Thus, the invention relates, according to a first subject-matter, to a process for the preparation of a copolymer comprising a backbone based on methacrylate units which comprises a stage of polymerization of one or more methacrylate monomers which are precursors of the said units in the presence:

of at least one polymerization initiator;
of at least one transfer agent of the "RAFT" type capable of generating a primary radical (subsequently referred to simply as primary agent) of formula

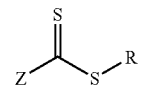

where R is $CH_2R1$ with R1 selected from the group consisting of an optionally substituted alkyl; of a saturated, unsaturated or aromatic carbocyclic or heterocyclic ring which is optionally substituted; or of an optionally substituted alkylthio group; of an optionally substituted alkoxy group; of an optionally substituted diallylamino group; of an organometallic substance; of a polymer chain prepared by any polymerization mechanism; and of a radical $R^-$ which releases free radicals, which initiates the polymerization by free radicals, where Z is selected from the group consisting of hydrogen, chlorine, an optionally substituted alkyl group, an optionally substituted aryl group, an optionally substituted heterocycle group, an optionally substituted alkylthio group —SR2, an optionally substituted alkoxycarbonyl group, an optionally substituted aryloxycarbonyl group (—COOR2), a carboxyl group (—COOH), an optionally substituted acyloxy group (—OOCR2), an optionally substituted carbamoyl group (—CONR2), a cyano group (—CN), a dialkyl- or diarylphosphonato group [—P(=O)OR2$_2$], a dialkyl- or diarylphosphinato group [—P(=O)R2$_2$], a polymer chain prepared by any polymerization mechanism, an —OR2 group and an NR2R3 group;

where R2 and R3, which are identical or different, are selected from the group consisting of an optionally substituted $C_1$ to $C_{18}$ alkyl, a $C_2$ to $C_{15}$ alkenyl group, an aryl group, a heterocyclyl group, an aralkyl group and an alkaryl group, in which the substituents are independently selected from the group which is composed of an epoxy, hydroxyl, alkoxy, acyl, acyloxy, carboxyl (and its salts), sulphonic acid (and its salts), alkoxy- or aryloxycarbonyl, isocyanato, cyano, silyl, halo and dialkylamino group;

and of at least one comonomer chosen from styrene monomers, acrylic monomers, such as acrylic acid and its salts, acrylonitrile, acrylamide or substituted acrylamides, 4-acryloylmorpholine, N-methylolacrylamide, acrylamidopropyltrimethylammonium chloride (APTAC), acrylamidomethylpropanesulphonic acid (AMPS) or its salts, methacrylamide or substituted methacrylamides, N-methylolmethacrylamide, methacrylamidopropyltrimethylammonium chloride (MAPTAC), itaconic acid, maleic acid or its salts, maleic anhydride, or alkyl or alkoxy or aryloxy polyalkylene glycol maleates or hemimaleates, vinylpyridine, vinylpyrrolidinone, (alkoxy) poly(alkylene glycol) vinyl ether or divinyl ether, such as methoxy poly(ethylene glycol) vinyl ether or poly(ethylene glycol) divinyl ether, olefinic monomers, among which may be mentioned ethylene, propylene, butene, hexene and 1-octene, as well as fluorinated olefinic monomers, and vinylidene monomers, among which may be mentioned vinylidene fluoride, preferably vinylidene chloride, alone or as a mixture.

Mention may be made, as examples of methacrylate units, of methacrylic monomers, such as methacrylic acid or its salts, alkyl, cycloalkyl, alkenyl or aryl methacrylates, such as methyl, lauryl, cyclohexyl, allyl or phenyl methacrylates, hydroxyalkyl methacrylates, such as 2-hydroxyethyl methacrylate or 2-hydroxypropyl methacrylate, etheralkyl methacrylates, such as 2-ethoxyethyl methacrylate, alkoxy or aryloxy polyalkylene glycol methacrylates, such as methoxy polyethylene glycol methacrylates, ethoxy polyethylene glycol methacrylates, methoxy polypropylene glycol methacrylates, methoxy polyethylene glycol/polypropylene glycol methacrylates or their mixtures, aminoalkyl methacrylates, such as 2-(dimethylamino)ethyl methacrylate (MADAME), amine salts methacrylates, such as [2-(meth-acryloyloxy) ethyl]trimethylammonium chloride or sulphate or [2-(methacryloyloxy)ethyl]dimethyl benzyl ammonium chloride or sulphate, fluorinated methacrylates, such as 2,2,2-trifluoroethyl methacrylate, silylated methacrylates, such as 3-methacryloyloxypropyltrimethylsilane, phosphorus-comprising methacrylates, such as alkylene glycol phosphate methacrylates, hydroxyethylimidazolidone methacrylate, hydroxyethylimidazolidinone methacrylate or 2-(2-oxo-1-imidazolidinyl)ethyl methacrylate.

Mention may be made, as examples of styrene monomers, of styrene or substituted styrenes, in particular α-methylstyrene, sodium styrenesulphonate or bromostyrene.

Mention may be made, as examples of acrylic monomers, of acrylic acid or its salts, alkyl, cycloalkyl or aryl acrylates, such as methyl, ethyl, butyl, ethylhexyl or phenyl acrylate, hydroxyalkyl acrylates, such as 2-hydroxyethyl acrylate, etheralkyl acrylates, such as 2-methoxyethyl acrylates, alkoxy or aryloxy polyalkylene glycol acrylates, such as methoxy polyethylene glycol acrylates, ethoxy polyethylene glycol acrylates, methoxy polypropylene glycol acrylates, methoxy polyethylene glycol/polypropylene glycol acrylates or their mixtures, aminoalkyl acrylates, such as 2-(dimethylamino)ethyl acrylate (ADAME), amine salt acrylates, such as [2-(acryloyloxy)ethyl]trimethylammonium chloride or sulphate or [2-(acryloyloxy)ethyl]dimethylbenzylammonium chloride or sulphate, fluorinated acrylates, silylated acrylates or phosphorus-comprising acrylates, such as alkylene glycol phosphate acrylates.

Mention may in particular be made, among chain transfer agents, of dithioesters, dithiocarbonates or xanthates, dithiocarbamates and trithiocarbonates, which can be represented by one of the following formulae:

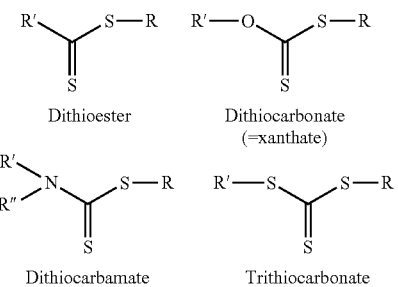

Dithioesters which can be advantageously used in the context of the invention are those corresponding to the following formula (I):

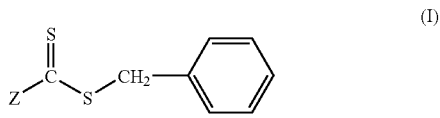

in which Z represents a group chosen from $C_6H_5$, —$CH_3$, a pyrrole group, —$OC_6F_5$, a pyrrolidinone group, —$OC_6H_5$, —$OC_2H_5$, —$N(C_2H_5)_2$ and, advantageously, —S—$CH_2$—$C_6H_5$: dibenzyl trithiocarbonate of following formula (II):

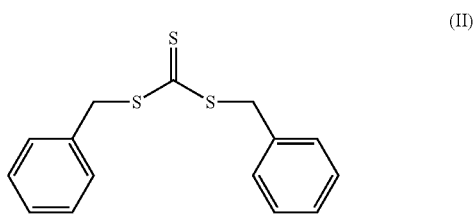

Generally, the transfer agent is added in an amount ranging from 0.1% to 20% by weight, with respect to the weight of monomer(s), preferably from 0.1% to 15% by weight and more preferably still from 0.25% to 10% by weight.

In addition to the transfer agent, the polymerization medium also comprises at least one polymerization initiator. The term "polymerization initiator" is understood to conventionally mean a chemical entity capable of producing free radicals which will add to the monomers to produce propagating radical entities from which the polymerization can be propagated. The initiators used can be chosen from organic or inorganic peroxides, azo compounds, redox pairs and/or alkoxyamines.

Mention may be made, as examples of azo compounds, of 2,2'-azobis(isobutyronitrile), 2,2'-azobis(2-cyano-2-butane), 2,2'-azobis(methyl isobutyrate), 4,4'-azobis(4-cyanopentanoic acid), 4,4'-azobis(4-cyanopentan-1-ol), 1,1'-azobis (cyclohexanecarbonitrile), 2,2'-azobis(N,N'-di-methyleneisobutyramidine) hydrochloride, 2,2'-azobis(2-amidinopropane) hydrochloride, 2,2'-azobis(N,N'-dimethyleneisobutyramine), 2,2'-azobis(2-methyl-N-[1,1-bis(hydroxymethyl)-2-hydroxyethyl]propionamide), 2,2'-azo-bis(2-methyl-N-[1,1-bis(hydroxymethyl)ethyl] propionamide), 2,2'-azobis(2-methyl-N-(2-hydroxyethyl) propionamide), 2,2'-azobis(isobutyramide) hydrate, 2,2'-azobis(2,2,4-trimethylpentane) or 2,2'-azobis(2-methylpropane).

Mention may be made, as examples of peroxide compounds, of t-butyl peroxyacetate, t-butyl peroxybenzoate, t-butyl peroxyoctoate, t-butyl peroxyneodecanoate, t-butyl peroxyisobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulphate or ammonium peroxydisulphate.

Mention may be made, as examples of nitrite compounds, of di(t-butyl) hyponitrite or dicumyl hyponitrite.

Generally, the polymerization initiator is added in an amount ranging from 1% to 50% by weight, with respect to the weight of transfer agent, preferably from 2% to 35% by weight and more preferably still from 5% to 20% by weight.

The presence of the comonomers in addition to the transfer agents as defined above advantageously makes it possible to reduce the polydispersity index of the copolymers obtained.

These comonomers are advantageously introduced into the polymerization medium in a content not exceeding 50% by weight, with respect to the methacrylic monomer, for example ranging from 10% to 40% and preferably from 1% to 25%.

The process of the preparation of the copolymer based on methacrylate units according to the invention can be carried out by the solvent route, in bulk or in dispersed media (such as emulsion or suspension). The emulsion can be a miniemulsion or a microemulsion.

When the polymerization takes place under emulsion conditions, at least one emulsifying agent, that is to say a surfactant which makes it possible to stabilize the emulsion, can be added to the polymerization media. Any emulsifying agent customary for this type of emulsion can be used.

The emulsifying agent can be anionic, cationic or nonionic. The emulsifying agent can be an amphoteric or quaternary or fluorinated surfactant. It can be chosen from alkyl or aryl sulphates, alkyl- or arylsulphonates, fatty acid salts, polyvinyl alcohols or polyethoxylated fatty alcohols. By way of example, the emulsifying agent can be chosen from the following list:
  sodium lauryl sulphate,
  sodium dodecylbenzenesulphonate,
  sodium stearate,
  polyethoxylated nonylphenol,
  sodium dihexyl sulphosuccinate,
  sodium dioctyl sulphosuccinate,
  lauryldimethylammonium bromide,
  lauryl amido betaine,
  potassium perfluorooctylacetate.

The emulsifying agent can also be a block or random or grafted amphiphilic copolymer, such as sodium styrenesulphonate copolymers and in particular polystyrene-b-poly (sodium styrenesulphonate), or any amphiphilic copolymer prepared by any other polymerization technique.

The emulsifying agent can be introduced into the polymerization medium in a proportion of 0.1% to 10% by weight, with respect to the weight of the monomer(s).

Generally, the process of the invention is carried out at a temperature ranging from 20° C. to 200° C., preferably from 40° C. to 150° C. and more preferably from 50° C. to 120° C.

Another subject-matter of the present invention is the copolymers based on methacrylate units capable of being obtained according to the preparation process defined above and more particularly the copolymers in which the monomer is methyl methacrylate and the comonomer is n-butyl acrylate and/or styrene, the transfer agent preferably being a trithiocarbonate, such as dibenzyl trithiocarbonate.

The process of the invention is a radical process which is controlled and living, in so far as it has been found that:
  the number-average molecular weight (Mn) as a function of the conversion of the monomers to polymers changes linearly and that the natural logarithm of the ratio ($M_0$/M) ($M_0$ representing the initial concentration of monomer(s) and M representing the concentration of monomers at a given instant in the polymerization) changes linearly as a function of time;
  it is possible to reinitiate at least a portion of the polymer chains obtained by this process by the addition of a monomer, in order to manufacture a block grafted to the living polymer obtained.

It is thus very naturally that the process of the invention mentioned above applies to the preparation of block copolymers.

Thus, the invention relates, according to a third subject-matter, to a process for the preparation of a block copolymer comprising at least one block, referred to as block A, comprising methacrylate units, which units result from the polymerization of one or more methacrylate monomers, in which process the said block or blocks A are prepared by the implementation of the process for the preparation of the copolymer based on methacrylate units as defined above, the copolymer thus being incorporated in the block copolymer in the form of a block.

Due to the living nature of this block, it is thus possible to access a very large number of architectures of block copolymers, according to the order of introduction of the constituent monomers of each of the blocks and the nature of the initiator and control agent used.

Thus, it is possible to obtain, in accordance with the invention, copolymers comprising at least one block A and at least one block B, connected to one another via a covalent bond, by a process successively comprising:
  a) a stage of implementation of the process as defined above;
  b) a stage of addition of the constituent monomers of the block B.

It is possible between stages a) and b), to provide a stage of removal of the residual monomers which have not reacted during stage a).

The constituent monomers of the block B can be chosen from methacrylate monomers other than those used in block A, optionally comprising acid, anhydride, hydroxyl, amine, poly(ethylene glycol) or poly(ethylene oxide) functionalities, acrylate monomers, optionally comprising functionalities as defined above, styrene monomers and mixtures of these.

By virtue of the implementation of stage a), it is possible to obtain block copolymers exhibiting a polydispersity index close to 2, this characteristic thus making it possible to obtain products possessing improved rheology used in applications such as lubricants, varnish rheology modifiers, paints, coatings or dispersants.

The control of the polymerization of methacrylate monomers opens the possibility of preparing copolymers of high molecular weight, which can prove to be beneficial as manufacturing additive for the conversion of thermoplastics, for example polyvinyl chloride.

The block copolymers which can be prepared according to the invention can be ternary copolymers (that is to say, comprising three blocks), it being possible for these ternary copolymers in particular to be used as polymer additives. These copolymers can, for example, act as compatibilizing agents for matrices of different natures, this being the case by virtue of the presence of the end blocks of different chemical natures, while optionally acting as impact additive if the central block is chosen from the family of the elastomers.

The invention will now be described in relation to the following examples, which are given by way of illustration and without implied limitation.

DETAILED ACCOUNT OF SPECIFIC EMBODIMENTS

Comparative Example 1

Figure 1:
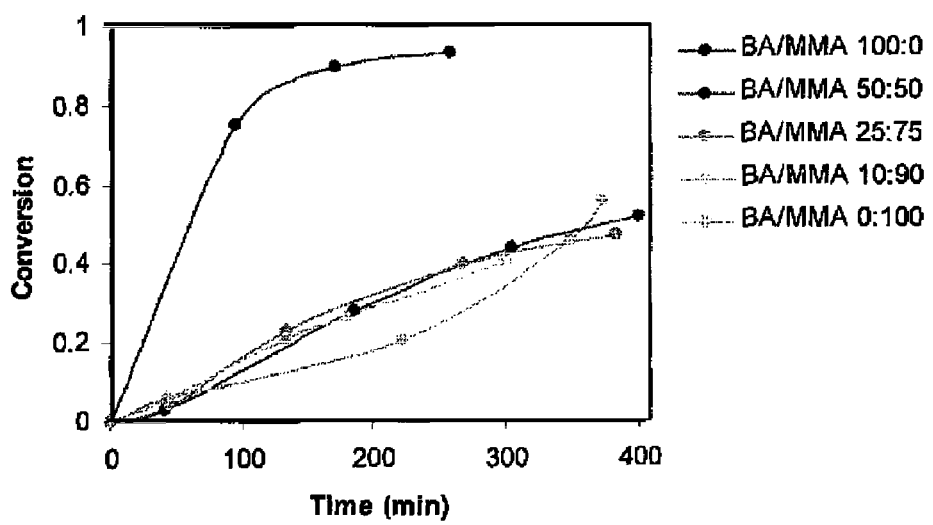
FIG. 1 is a graph illustrating the degree of conversion as a function of time for various mixtures (n-butyl acrylate/methyl methacrylate).

This example illustrates the polymerization of methyl methacrylate in solution in the presence of dibenzyl trithiocarbonate (DBTTC).

150 g of methyl methacrylate (i.e., 1.5 mol), 150 g of methoxypropyl acetate (i.e., 1.14 mol), 0.038 g of azobisisobutyronitrile (i.e., 0.231 mmol) and 0.658 g of dibenzyl trithiocarbonate (i.e., 2.27 mmol) are introduced into a polymerization reactor equipped with a variable-speed motorized stirrer, with inlets for the introduction of the reactants, with branch connections for the introduction of inert gases which make it possible to drive off the oxygen, such as nitrogen, with measurement probes (for example for measuring temperature), of a system for condensing vapours with reflux, and with a jacket which makes it possible to heat/cool the contents of the reactor by virtue of the circulation in the jacket of a heat-transfer fluid.

After several degassing operations with nitrogen, the reaction medium is brought to 80° C. and this temperature is maintained by thermal regulation for several hours. Samples are withdrawn throughout the reaction in order:
  to determine the polymerization kinetics by gravimetric analysis (measurement of solids content);
  to monitor the change in the number-average molecular weight (Mn) as a function of the conversion of the monomer to polymer.

After 6 h 15, a conversion of 56% is achieved and the reaction medium is cooled to ambient temperature and then withdrawn from the reactor and the residual solvents and monomers are removed by evaporation under vacuum.

The molecular weights of the poly(methyl methacrylate) as PMMA equivalent, determined by steric exclusion chromatography, are 147 000 g/mol for the number-average molar mass (Mn) and 420 000 g/mol for the weight-average molar mass (Mw). The polydispersity index is 2.87.

Comparative Example 2

This example illustrates the polymerization of n-butyl acrylates in solution in the presence of dibenzyl trithiocarbonate (DBTTC).

The procedure is identical to that mentioned in Example 1. 150 g of n-butyl acrylate (i.e., 1.17 mol), 150 g of methoxypropyl acetate (i.e., 1.13 mol), 0.038 g of azobisisobutyronitrile (i.e., 0.231 mmol) and 0.659 g of dibenzyl trithiocarbonate (i.e., 2.27 mmol) are introduced.

After 4 h 15, a conversion of 93% is achieved and the reaction medium is cooled to ambient temperature and then withdrawn from the reactor and the residual solvents and monomers are removed by evaporation under vacuum.

The molecular weights of the poly(n-butyl acrylates), as polystyrene equivalent, determined by steric exclusion chromatography, are 36 000 g/mol for the number-average molar mass (Mn) and 53 000 g/mol for the weight-average molar mass (Mw). The polydispersity index is 1.55.

Comparative Example 3

This example illustrates the bulk polymerization of styrene in the presence of dibenzyl trithiocarbonate (DBTTC).

The procedure is identical to that mentioned in Example 1. 300 g of styrene (i.e., 2.88 mol), 0.0747 g of azobisisobutyronitrile (i.e., 0.455 mmol) and 1.32 g of dibenzyl trithiocarbonate (i.e., 4.54 mmol) are introduced.

After 6 h 15, a conversion of 21% is achieved and the reaction medium is cooled to ambient temperature and then withdrawn from the reactor and the residual solvents and monomers are removed by evaporation under vacuum.

The molecular weights of the polystyrene, in polystyrene equivalent, determined by steric exclusion chromatography, are 11 300 g/mol for the number-average molar mass (Mn) and 16 000 g/mol for the weight-average molar mass (Mw). The polydispersity index is 1.41.

Example 4

According to the Invention

This example illustrates, in accordance with the invention, the polymerization of methyl methacrylate in the presence of dibenzyl trithiocarbonate (DBTTC) and of n-butyl acrylate.

The procedure is identical to that mentioned in Example 1, X g of methyl methacrylate and Y g of n-butyl acrylate (such that X+Y=150 g), 150 g of methoxypropyl acetate (i.e., 1.14 mol), 0.038 g of azobisisobutyronitrile (i.e., 0.233 mmol) and 0.661 g of dibenzyl trithiocarbonate (i.e., 2.28 mmol) are introduced.

At the end of the reaction, the reaction medium is cooled to ambient temperature and then withdrawn from the reactor and the residual solvents and monomers are removed by evaporation under vacuum. The change in the conversion with time according to the type of mixture is illustrated in FIG. 1.

The molecular weights of the polymers thus obtained, as a function of the ratio (n-butyl acrylate/methyl methacrylate), as polymethyl methacrylate equivalent, determined by steric exclusion chromatography, are listed in the following table.

|  | Example No. | | | | |
|---|---|---|---|---|---|
|  | 2 | 4-a | 4-b | 4-c | 1 |
| BA/MMA Ratio | BA/MMA 100:0 | BA/MMA 50:50 | BA/MMA 25:75 | BA/MMA 10:90 | BA/MMA 0:100 |
| Number-average molecular weight (Mn) | 36 000 | 28 000 | 36 000 | 65 500 | 147 000 |
| Weight-average molecular weight (Mw) | 53 500 | 51 000 | 78 000 | 148 000 | 421 000 |
| Mw/Mn | 1.5 | 1.8 | 2.2 | 2.3 | 2.9 |
| Conversion | 0.93 | 0.51 | 0.47 | 0.49 | 0.56 |
| Time (in min) | 258 | 400 | 383 | 300 | 373 |

With a substantially equal polymerization time, a decrease in the polydispersity index is thus observed for the examples according to the invention when the amount of n-butyl acrylate increases.

Example 5

According to the Invention

This example illustrates, in accordance with the invention, the polymerization of methyl methacrylate in the presence of dibenzyl trithiocarbonate (DBTTC) and of styrene.

The procedure is identical to that mentioned in Example 1. X g of methyl methacrylate and Y g of styrene (such that X+Y=300), 0.075 g of azobisisobutyronitrile (i.e., 0.456 mmol) and 1.321 g of dibenzyl trithiocarbonate (i.e., 4.55 mmol) are introduced.

Figure 2:
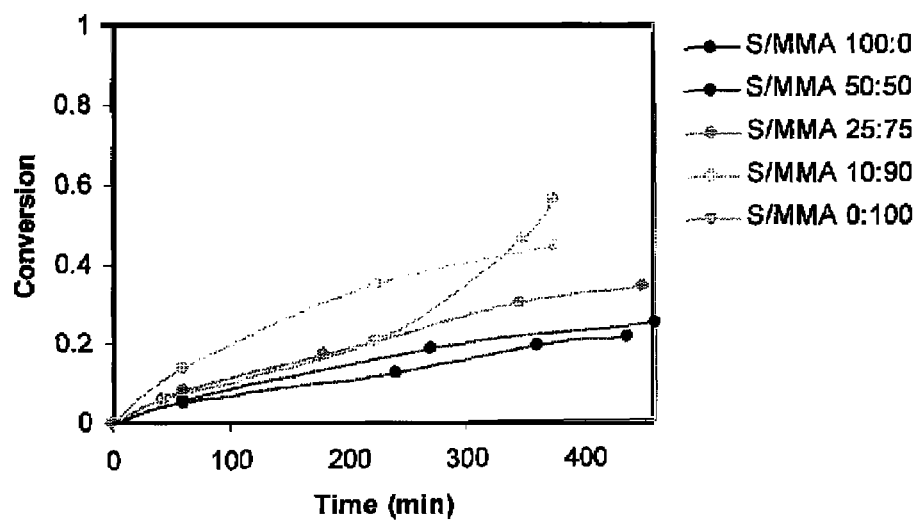
FIG. 2 is a graph illustrating the degree of conversion as a function of time for various mixtures (styrene/methyl methacrylate).

At the end of the reaction, the reaction medium is cooled to ambient temperature and then withdrawn from the reactor and the residual solvents and monomers are removed by evaporation under vacuum. The change in the conversion with time according to the type of mixture is illustrated in FIG. 2.

The molecular weights of the polymers thus obtained, as a function of the ratio (styrene/methyl methacrylate), as polymethyl methacrylate equivalent, determined by steric exclusion chromatography, are listed in the following table.

|  | Example No. | | | | |
|---|---|---|---|---|---|
|  | 3 | 5-a | 5-b | 5-c | 1 |
| S/MMA Ratio | S/MMA 100:0 | S/MMA 50:50 | S/MMA 25:75 | S/MMA 10:90 | S/MMA 0:100 |
| Number-average molecular weight (Mn) | 11 300 | 16 900 | 28 200 | 45 900 | 147 000 |
| Weight-average molecular weight (Mw) | 16 000 | 30 000 | 52 000 | 89 000 | 421 000 |
| Mw/Mn | 1.41 | 1.78 | 1.84 | 1.93 | 2.86 |
| Conversion | 0.21 | 0.25 | 0.34 | 0.44 | 0.56 |
| Time (in min) | 435 | 460 | 450 | 375 | 373 |

With a substantially equal polymerization time, a decrease in the polydispersity index is observed for the examples according to the invention when the amount of styrene increases.

The invention claimed is:

1. Preparation process for the preparation of a copolymer comprising a backbone based on methacrylate units which comprises the step of polymerizing one or more methacrylate monomers which are precursors of the said methacrylate units in the presence:
of at least one polymerization initiator, chosen from organic or inorganic peroxides, azo compounds, redox pairs and/or alkoxyamines;
of at least one reversible addition fragmentation transfer (RAFT) transfer agent capable of generating a primary radical of formula

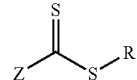

where R is $CH_2R1$ with R1 selected from the group consisting of an optionally substituted alkyl; of a saturated, unsaturated or aromatic carbocyclic or heterocyclic ring which is optionally substituted; or of an optionally substituted alkylthio group; of an optionally substituted alkoxy group; of an optionally substituted diallylamino group; of an organometallic substance; of a polymer chain prepared by any polymerization mechanism; and of a radical $R^-$ which releases free radicals, which initiates the polymerization by free radicals, where Z is selected from the group consisting of hydrogen, chlorine, an optionally substituted alkyl group, an optionally substituted aryl group, an optionally substituted heterocycle group, an optionally substituted alkylthio group —SR2, an optionally substituted alkoxycarbonyl group, an optionally substituted aryloxycarbonyl group (—COOR2), a carboxyl group (—COOH), an optionally substituted acyloxy group (—OOCR2), an optionally substituted carbamoyl group (—CONR2), a cyano group (—CN), a dialkyl- or diarylphosphonato group [—P(=O)OR2$_2$], a dialkyl- or diarylphosphinato group [—P(=O)R2$_2$], a polymer chain prepared by any polymerization mechanism, an —OR2 group and an —NR2R3 group;

where R2 and R3, which are identical or different, are selected from the group consisting of an optionally substituted $C_1$ to $C_{18}$ alkyl, a $C_2$ to $C_{18}$ alkenyl group, an aryl group, a heterocyclyl group, an aralkyl group and an alkaryl group, in which the substituents are independently selected from the group which is composed of an epoxy, hydroxyl, alkoxy, acyl, acyloxy, carboxyl (and its salts), sulphonic acid (and its salts), alkoxy- or aryloxycarbonyl, isocyanato, cyano, silyl, halo and dialkylamino group;

of one or more acrylic monomers;

and optionally of one or more comonomers chosen from styrene monomers, acrylonitrile, acrylamide or substituted acrylamides, 4-acryloylmorpholine, N-methylolacrylamide, acrylamidopropyltrimethylammonium chloride (APTAC), acrylamidomethylpropanesulphonic acid (AMPS) or its salts, methacrylamide or substituted methacrylamides, N-methylolmethacrylamide, methacrylamidopropyltrimethylammonium chloride (MAPTAC), itaconic acid, maleic acid or its salts, maleic anhydride, alkyl or alkoxy or aryloxy polyalkylene glycol maleates or hemimaleates, vinylpyridine, vinylpyrrolidinone, (alkoxy)poly(alkylene glycol) vinyl ether or divinyl ether, methoxy poly(ethylene glycol) vinyl ether or poly(ethylene glycol) divinyl ether, olefinic monomers, ethylene, propylene, butene, hexane, 1-octene, fluorinated olefinic monomers, vinylidene monomers, vinylidene fluoride, vinylidene chloride, and mixtures thereof;

whereby the one or more methacrylate monomers, the one or more acrylic monomers, and the optional one or more comonomers randomly copolymerize.

2. Preparation process according to claim 1, in which the primary transfer agent is chosen from dithioesters, dithiocarbonates or xanthates, dithiocarbamates and trithiocarbonates.

3. Preparation process according to claim 1, in which the primary transfer agent corresponds to the following formula (I):

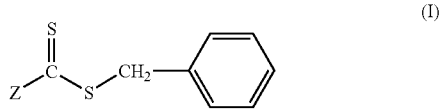

in which Z represents a group chosen from —$C_6H_5$, —$CH_3$, a pyrrole group, —$OC_6F_5$, a pyrrolidinone group, —$OC_6H_5$, —$OC_2H_5$, —$N(C_2H_5)_2$ and —S—$CH_2$—$C_6H_5$ (dibenzyl trithiocarbonate).

4. Preparation process according to claim 1, in which the methacrylate monomer or monomers are selected from the group consisting of methacrylic monomers; methacrylic acid or its salts; alkyl, cycloalkyl, alkenyl or aryl methacrylates; methyl, lauryl, cyclohexyl, allyl or phenyl methacrylates; hydroxyalkyl methacrylates; 2-hydroxyethyl methacrylate or 2-hydroxypropyl methacrylate; etheralkyl methacrylates; 2-ethoxyethyl methacrylate; alkoxy or aryloxy polyalkylene glycol methacrylates; methoxy polyethylene glycol methacrylates, ethoxy polyethylene glycol methacrylates, methoxy polypropylene glycol methacrylates, methoxy polyethylene glycol/polypropylene glycol methacrylates or their mixtures; aminoalkyl methacrylates; 2-(dimethylamino) ethyl methacrylate (MADAME); amine salts methacrylates; [2-(methacryloyloxy)ethyl]trimethylammonium chloride or sulphate and [2-(methacryloyloxy)ethyl]dimethylbenzylammonium chloride or sulphate, fluorinated methacrylates; 2,2, 2-trifluoroethyl methacrylate; silylated methacrylates; 3-methacryloyloxypropyltrimethylsilane; phosphorus-comprising methacrylates; alkylene glycol phosphate methacrylates, hydroxyethylimidazolidone methacrylate, hydroxyethylimidazolidinone methacrylate and 2-(2-oxo-1-imidazolidinyl)ethyl methacrylate.

5. Preparation process according to claim 1, in which the styrene monomers are selected from the group consisting of styrene, substituted styrenes, α-methylstyrene, sodium styrenesulphonate and bromostyrene.

6. Preparation process according to claim 1, in which the acrylic monomers are selected from the group consisting of styrene acrylic acid or its salts, alkyl; cycloalkyl or aryl acrylates; methyl, ethyl, butyl, ethylhexyl or phenyl acrylate; hydroxyalkyl acrylates; 2-hydroxyethyl acrylate; etheralkyl acrylates; 2-methoxyethyl acrylates; alkoxy or aryloxy polyalkylene glycol acrylates; methoxy polyethylene glycol acrylates; ethoxy polyethylene glycol acrylates, methoxy polypropylene glycol acrylates, methoxy polyethylene glycol/polypropylene glycol acrylates or their mixtures; aminoalkyl acrylates; 2-(dimethylamino)ethyl acrylate (ADAME); amine salt acrylates; [2-(acryloyloxy)ethyl]trimethylammonium chloride or sulphate; [2-(acryloyloxy)ethyl] dimethylbenzylammonium chloride or sulphate; fluorinated acrylates, silylated acrylates or phosphorus-comprising acrylates; alkylene glycol phosphate acrylates.

7. Preparation process according to claim 1, in which the transfer agent is added in an amount ranging from 0.1% to 20% by weight, with respect to the weight of monomer(s).

8. Process for the preparation of a block copolymer comprising at least one block, referred to as block A, comprising methacrylate units, which units result from the polymerization of one or more methacrylate monomers, in which process the said block or blocks A are prepared by the implementation of the process as defined according to claim 1.

9. Copolymer obtained by the preparation process according to claim 1.

10. Copolymer according to claim 9, in which the methacrylate monomer is methyl methacrylate, the comonomer is n-butyl acrylate and the transfer agent is dibenzyl trithiocarbonate.

11. Copolymer according to claim 9, in which the monomer is methyl methacrylate, the comonomer is styrene and the transfer agent is dibenzyl trithiocarbonate.

12. Copolymer of claim 9 comprising a manufacturing additive for the conversion of thermoplastics compatibilizing agents for matrices of different natures or impact additives.

13. Preparation process according to claim 7, in which the transfer agent is added in an amount ranging from 0.1% to 15% by weight, with respect to the weight of monomer(s).

14. Preparation process according to claim 13, in which the transfer agent is added in an amount ranging from 0.125% to 10% by weight, with respect to the weight of monomer(s).

* * * * *